(12) United States Patent
Martin et al.

(10) Patent No.: US 11,304,422 B2
(45) Date of Patent: Apr. 19, 2022

(54) APPARATUS FOR CLOSING PASTY-SUBSTANCE-FILLED TUBULAR CASINGS, AND METHOD FOR OPERATING THE APPARATUS

(71) Applicant: VEMAG Maschinenbau GmbH, Verden (DE)

(72) Inventors: Knut Martin, Dortmund (DE); Sven Köhler, Langwedel (DE); Christian Kordel, Kirchlinteln (DE); Gunnar Jäckel, Jesteburg (DE)

(73) Assignee: VEMAG MASCHINENBAU GMBH, Verden (DE)

( * ) Notice: Subject to any disclaimer, the term of this patent is extended or adjusted under 35 U.S.C. 154(b) by 0 days.

(21) Appl. No.: 16/879,060

(22) Filed: May 20, 2020

(65) Prior Publication Data
US 2020/0367519 A1   Nov. 26, 2020

(30) Foreign Application Priority Data
May 21, 2019 (DE) ..................... 10 2019 113 542.7

(51) Int. Cl.
*A22C 11/00* (2006.01)
*A22C 11/02* (2006.01)
*A22C 11/12* (2006.01)

(52) U.S. Cl.
CPC ...... *A22C 11/0254* (2013.01); *A22C 11/0263* (2013.01); *A22C 11/125* (2013.01)

(58) Field of Classification Search
CPC ... A22C 11/00; A22C 11/0245; A22C 11/254; A22C 11/0254; A22C 11/125; A22C 11/104

USPC ................ 452/30–32, 46–48, 51, 35–37
See application file for complete search history.

(56) References Cited

U.S. PATENT DOCUMENTS

| | | | | |
|---|---|---|---|---|
| 4,625,362 A | * | 12/1986 | Kollross | A22C 11/02 452/22 |
| 4,847,951 A | * | 7/1989 | Kollross | A22C 11/105 452/48 |
| 5,352,151 A | * | 10/1994 | Piereder | A22C 11/0227 452/32 |
| 5,743,792 A | * | 4/1998 | Hanten | A22C 11/0245 452/29 |

(Continued)

FOREIGN PATENT DOCUMENTS

| | | |
|---|---|---|
| DE | 202004007711 | 8/2004 |
| DE | 10 2005 044 877 | 3/2007 |

(Continued)

OTHER PUBLICATIONS

German Office Action in related DE Application No. 10 2019 113 542.7 dated Jun. 17, 2021, 2 pages.

*Primary Examiner* — Richard T Price, Jr.
(74) *Attorney, Agent, or Firm* — Andrew M. Calderon; Roberts Calderon Safran & Cole, P.C.

(57) ABSTRACT

An apparatus for closing pasty-substance-filled tubular casings to form products, in particular for closing sausage-meat-filled casings is disclosed. The apparatus includes a filling tube with an outlet opening, having a brake and having clipper blades, which can be moved toward one another in a direction transverse to a filling direction, and which includes a measuring device, which establishes the caliber of the products in a contactless.

9 Claims, 3 Drawing Sheets

(56) References Cited

U.S. PATENT DOCUMENTS

| | | | |
|---|---|---|---|
| 6,585,580 B1 * | 7/2003 | Hergott | A22C 11/0218 452/32 |
| 7,553,222 B2 | 6/2009 | Jaickel | |
| 8,015,779 B2 * | 9/2011 | Topfer | A22C 11/12 53/478 |
| 9,480,264 B2 * | 11/2016 | Schmid | A22C 11/0245 |

FOREIGN PATENT DOCUMENTS

| | | |
|---|---|---|
| EP | 1513407 | 3/2005 |
| EP | 1958511 | 8/2008 |
| EP | 2 783 571 | 10/2014 |
| EP | 2801258 | 11/2014 |

* cited by examiner

APPARATUS FOR CLOSING PASTY-SUBSTANCE-FILLED TUBULAR CASINGS, AND METHOD FOR OPERATING THE APPARATUS

FIELD OF INVENTION

The invention relates to an apparatus for closing pasty-substance-filled tubular casings, in particular sausage-meat-filled casings, to form products, having a filling tube with an outlet opening, having a brake and having clipper blades, which can be moved toward one another in a direction transverse to a filling direction. The invention also relates to a method for operating said apparatus.

BACKGROUND

Such an apparatus is known, for example, from EP 2 783 571 B1.

The main components of sausage-packing apparatuses are a filling device, a closing apparatus (clipper mechanism) for the filled casing and a transporting device for the products produced. The products can be, for example, sausages. The closing apparatus is provided with the clipper blades, by means of which it is possible to constrict the filled casing and displace the pasty substance in the casing in order to form a sausage end, one or two clips being positioned in the region of the casing from which the filling has been displaced, and the casing string possibly being severed. The casing is filled via the filling tube, through which the pasty substance flows, under pressure, into a casing-material tube which is closed at one end. A supply of the casing material is arranged in a gathered state outside the filling tube. The pasty substance is introduced uniformly into the casing as a result of the pressure of the filling tube, wherein further casing material is drawn off from the supply counter to the force of the brake. Once the desired product size has been reached, the casing is constricted and closed.

The clipper blades are provided for the purpose of constricting the casing, it being possible for said blades to be arranged in a vertical direction and then moved counter to one another. They can be moved from a fully open position into a closed position. While the clipper blades are closed and the clip or clips is or are being placed in position, the operation of filling the casing with pasty substance is interrupted. When the clipper blades are fully open again the filling operation is resumed and the string of products formed can be guided through between the two open clipper blades. In order that the closing apparatus can be used universally, the clipper blades have to be able to open to such an extent as to allow production of products with the maximum desired caliber (diameter).

Industrial sausage production requires a portioning output which is as high as possible. In order to achieve this, it is necessary for the starting and stopping movements of the filling machine and of the closing machine to be coordinated as precisely as possible with the cycle time of the clipper blades and the movement of the conveying machinery. In particular when small-caliber sausages are being produced, the period of time up until which the clipper blades are in their fully open position is a dead time because, even though the string of sausages with the smaller caliber could pass through the clipper blades even if the latter are not in a fully open position, the filling operation has not yet started.

For this purpose, EP 2 783 571 B1 makes provision for the closure apparatus and the filling machine to exchange process data via a communication interface such that the movement profile of the oppositely located clipper blades and the speed profile at which the pasty substance exits from the filling tube are adjusted automatically in relation to one another by a control device, wherein the speed profile is repeated cyclically and the starting time of a filling cycle is determined in dependence of the position of the clipper blades and the control device transmits a corresponding starting signal for filling purposes at the earliest when a distance between the clipper blades is large enough for the product to fit through the opening of the clipper blades.

The caliber of the product has to be entered manually into the filling apparatus. In particular when production is changed over from large-caliber products to small-caliber products—or vice versa—errors can occur. If the caliber is not entered precisely, or is not entered at all, the filling operation begins before the clipper blades have reached a sufficiently wide-open position. The casing is then filled against the clipper blades, which in the worst-case scenario results in the casing tearing and thus in production coming to a standstill.

In the case of the apparatus which is known from EP 2 783 571 B1, the caliber of the product can be determined in that, for the purpose of detecting the tautness of the filled sausage casing, a pressure-exerting element is applied and the distance covered by the pressure-exerting element and also the force which is necessary for movement are detected. Although it is, indeed, the case that the caliber can be calculated from the distance covered up until the force increases, it is nevertheless the case in respect of sensitive sausage casings that, if contact is involved in the measurement process, there is a risk of said fillings being damaged and, for example, tearing.

DE 10 2005 044 877 A1 discloses a portioning and packing apparatus having a contents-conveying means, having a filling tube connected thereto, and having a closing apparatus following said filling tube in a downstream direction, the intention being for the portioning output to be increased in that the contents are conveyed in a continuous volume flow, through a mouth opening of the filling tube, into a tubular casing, which is closed at one end, the casing is constricted downstream of the filling tube, during the filling operation, to form a twisted end and is closed by a closure element, wherein the constricting and closing operations take place at periodic intervals which have been calculated on the basis of a selected portion size and of the continuous volume flow.

SUMMARY OF INVENTION

Taking the above problem as the departure point, the intention is to create an apparatus which avoids incorrect caliber entries.

In order to solve the problem, an apparatus of the generic type is distinguished by a measuring device, which establishes the caliber of the products in a contactless manner. The caliber, which is established automatically during production, can then be used to control the filling machine. Since it is no longer necessary for the caliber to be entered manually, incorrect entries are effectively avoided and it is ensured that the operation of filling the casing is not begun before the clipper blades are located in a position in which they are sufficiently wide open to allow the string of products to pass through.

The measuring device preferably comprises a transmitter, a detector and an evaluating unit. The transmitter can be a light source and the detector can be a light/dark receiver. It is then possible for the dark region to be detected in the evaluating device as the caliber of the product.

If the measuring device is arranged downstream of the outlet opening of the filling tube and upstream of the brake, as seen in relation to the filling direction, the diameter established for the gathered casing is dependent on the thickness of the tubular casing and the diameter thereof. The evaluating device then has to correct the established value in accordance with the casing diameter and material thickness, in order for the caliber of the product to be calculated.

If the measuring device is arranged downstream of the brake and upstream of the clipper blades, or downstream of the clipper blades, the diameter of the filled casing, and thus the caliber of the product, is determined directly.

A filling machine for introducing the pasty substance is arranged upstream of the closing apparatus. It is possible to provide a control unit for the purpose of operating the closing apparatus and the filling machine one after the other in a coordinated manner, wherein the measuring device is then designed such that it emits to the control unit a signal for adapting the coordinated operation to the caliber of the products. The control unit can then be suitable for performing the adapting process such that the filling machine begins with the casing-filling operation while the clipper blades are moving from a closed position in the direction of an open position. It is conceivable for the control unit here to be able to perform the adapting process such that the smaller the caliber of the product, the earlier the start of the filling operation by the filling machine.

Since the operation of filling the casing with pasty substance is interrupted when the clipper blades are moved out of a closed position, in which they assume a minimum distance apart from one another and have displaced the pasty substance introduced into the casing, in the direction of an open position, in which they assume a maximum distance apart from one another, it is also the case that the apparatus according to the invention is operated according to the invention in that the operation of filling the casing with pasty substance is begun again when the clipper blades have reached a position in which their distance apart from one another is at least equal to the caliber established by the measuring device, and this position is reached at a point in time before the open position. This means that, rather than just beginning when the clipper blades are fully open, the operation of filling the casing begins when their distance apart from one another allows the caliber produced to be guided through between them.

BRIEF DESCRIPTION OF DRAWINGS

Exemplary embodiments of the invention will be described in more detail hereinbelow with the aid of drawings, in which.

DETAILED DESCRIPTION

Figure 1:
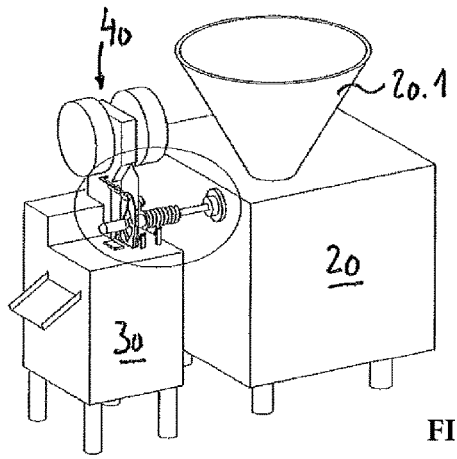
FIG. 1 shows the schematic and perspective illustration of a filling device and of a downstream closing device.
Figure 2:
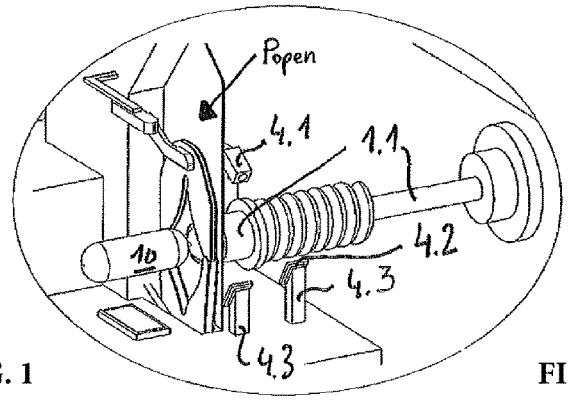
FIG. 2 shows an enlarged illustration from FIG. 1.
Figure 3:
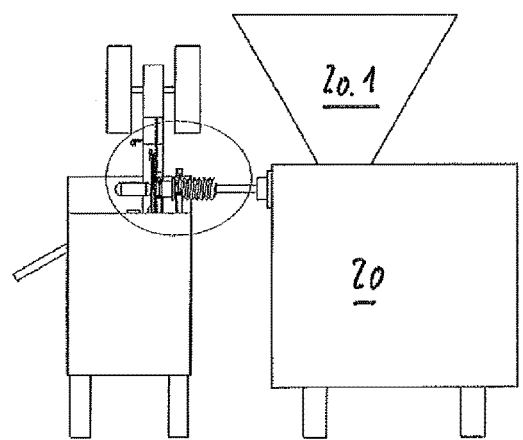
FIG. 3 shows a side view of the arrangement according to FIG. 1.
Figure 4:
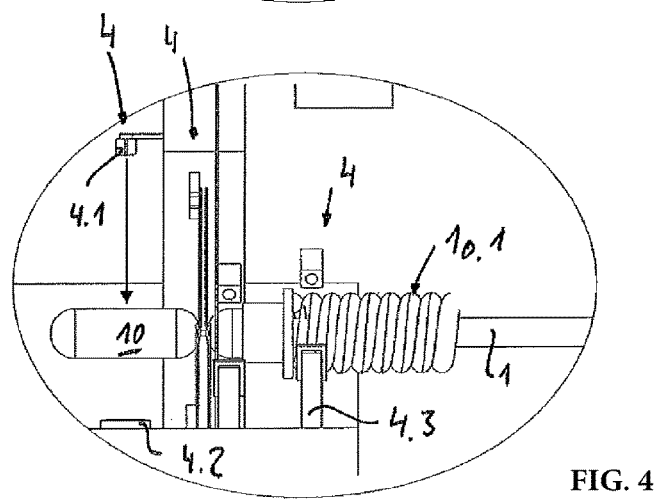
FIG. 4 shows an enlarged detail from FIG. 3.
Figure 5:
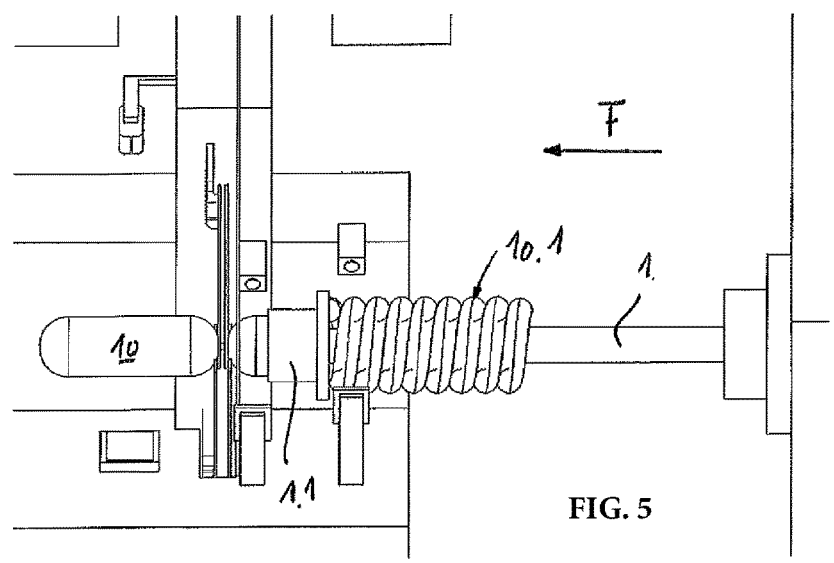
FIG. 5 shows a further-enlarged sub-view from FIG. 3.

That arrangement of an installation for producing sausages which is illustrated in FIG. 1 is sufficiently known. FIG. 2 shows an enlarged illustration from FIG. 1; FIG. 3 shows a side view of the arrangement according to FIG. 1; FIG. 4 shows an enlarged detail from FIG. 3; and FIG. 5 shows a further-enlarged sub-view from FIG. 3.

Referring to the figures, sausage meat is introduced into the filling machine 20 via a hopper 20.1. As shown in the figures, the filling tube 1 of said filling machine introduces the sausage meat into the casing 10.1, which is arranged on the filling tube 1 upstream of a brake 2, in this case the casing brake, in a gathered state to form a length of casing. The casing 10.1 is filled up against the brake 2, and the sausage produced is drawn off in the filling direction F, counter to the force of the brake 2, and guided away via a transporting device (not illustrated specifically here).

The closing apparatus 40 has two clipper blades 3.1, 3.2, which are coupled to one another and driven counter to one another. Said clipper blades 3.1, 3.2 move in the vertical direction from a fully open position $P_{open}$, which is illustrated in the figures, into a closed position $P_{closed}$, which is not illustrated specifically and in which the casing 10.1 is pinched together. The clipper blades 3.1, 3.2 are each of two-part design. The two parts 3.1.1, 3.1.2 and 3.2.1, 3.2.2 can be moved relative to one another in horizontal direction (filling direction F), as a result of which the sausage meat introduced into the casing 10.1 is displaced. One or two clips are then placed on said thin casing string in order for closed sausage ends to be formed. If appropriate, the casing string can be severed between the two clips to produce individual sausages 10, which are no longer linked to one another and can be transported away from the clipper mechanism 30.

Figure 6:
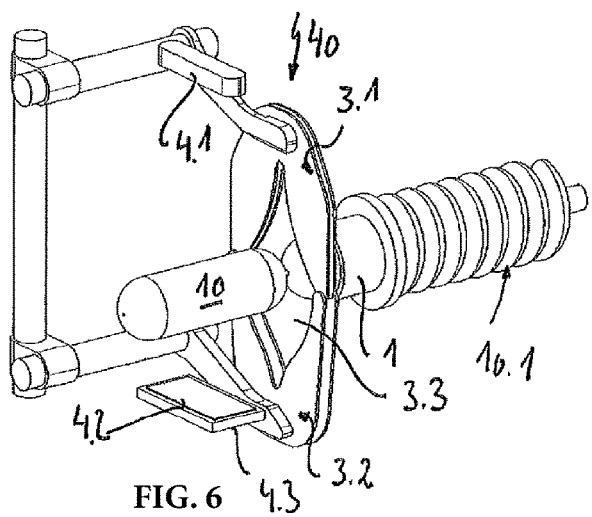
FIG. 6 shows a perspective and schematic illustration of a first exemplary embodiment.
Figure 7:
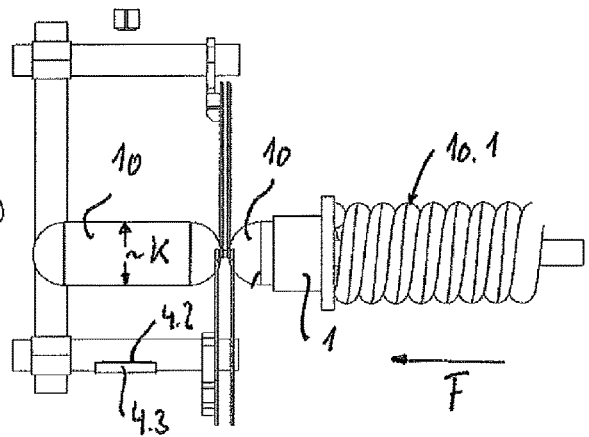
FIG. 7 shows the side view according to FIG. 6.

FIG. 4 shows three possible arrangements of the measuring device 4 (as represented within the circled area). A first arrangement is illustrated in detail in FIGS. 6 and 7. Downstream of the clipper blades 3.1, 3.2, as seen in the filling direction F, a light-emitting transmitter 4.1 is arranged above the sausage 10 and a receiver 4.2 is arranged beneath the sausage 10, said receiver detecting the light beams which strike it. The evaluating unit 4.3 can determine the caliber K of the sausage 10 from the locations where there are no light beams striking the receiver 2. The caliber K is the diameter D of the sausage 10.

Figure 8:
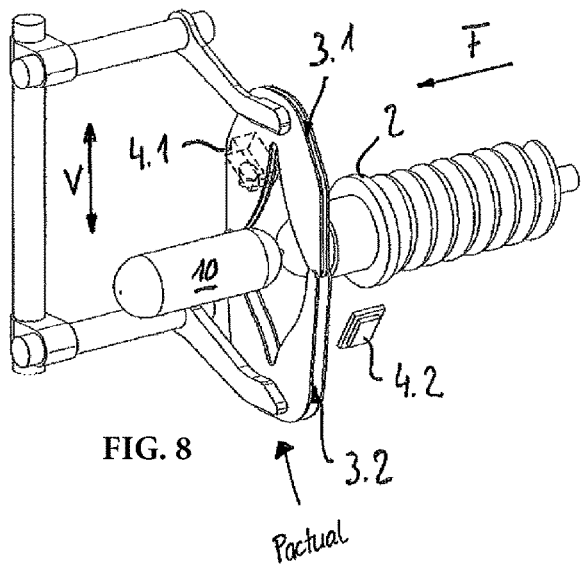
FIG. 8 shows a perspective and schematic illustration of a second exemplary embodiment.
Figure 9:
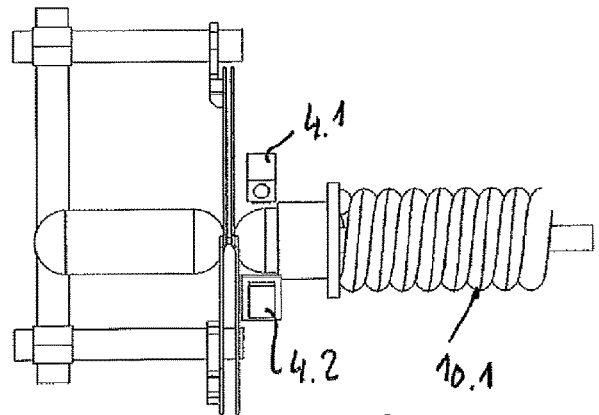
FIG. 9 shows the side view according to FIG. 8.

FIGS. 8 and 9 illustrate a second arrangement of the measuring device 4. The transmitter 4.1 and the receiver 4.2 are arranged between the casing brake 2 and the clipper blades 3.1, 3.2, as seen in the filling direction F, and thus detect the caliber K of the sausage 10 exiting from the filling tube 1.

Figure 10:
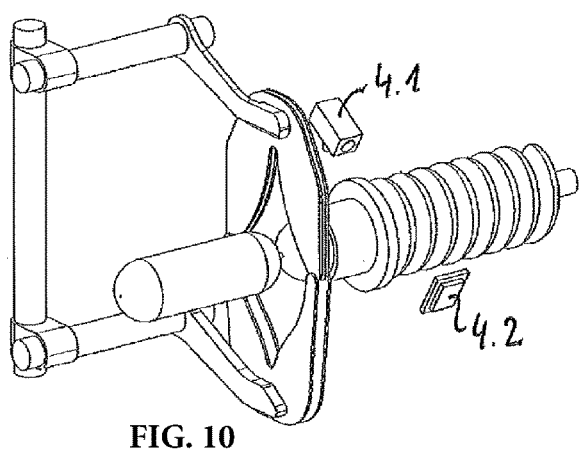
FIG. 10 shows a perspective and schematic illustration of a third exemplary embodiment.
Figure 11:
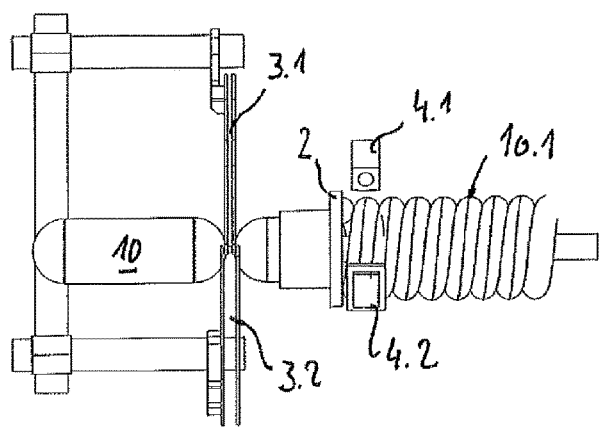
FIG. 11 shows the side view according to FIG. 10.
Figure 12:
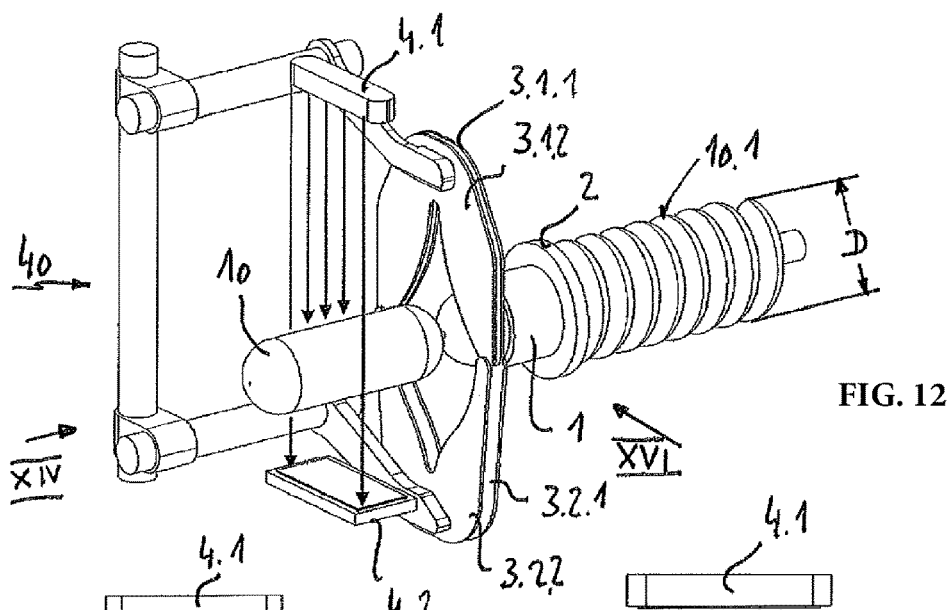
FIG. 12 shows the illustration according to FIG. 6 with operation of the measuring device indicated.
Figure 13:
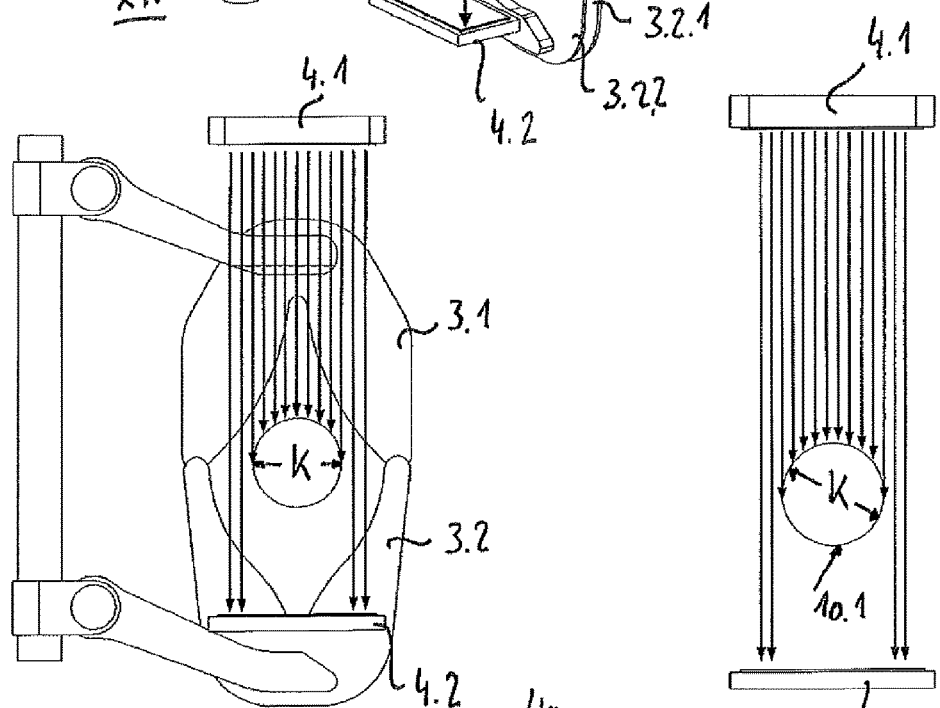
FIG. 13 shows the view as seen in the direction of arrow XIV according to FIG. 12.
Figure 14:
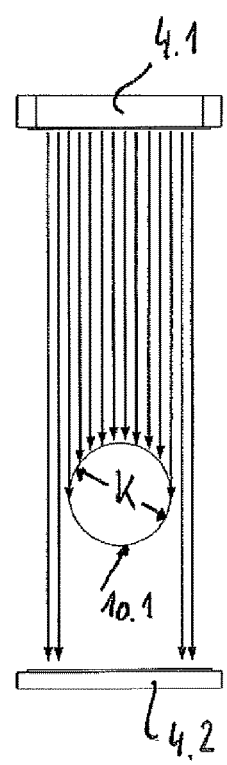
FIG. 14 shows a sub-illustration from FIG. 13.
Figure 15:
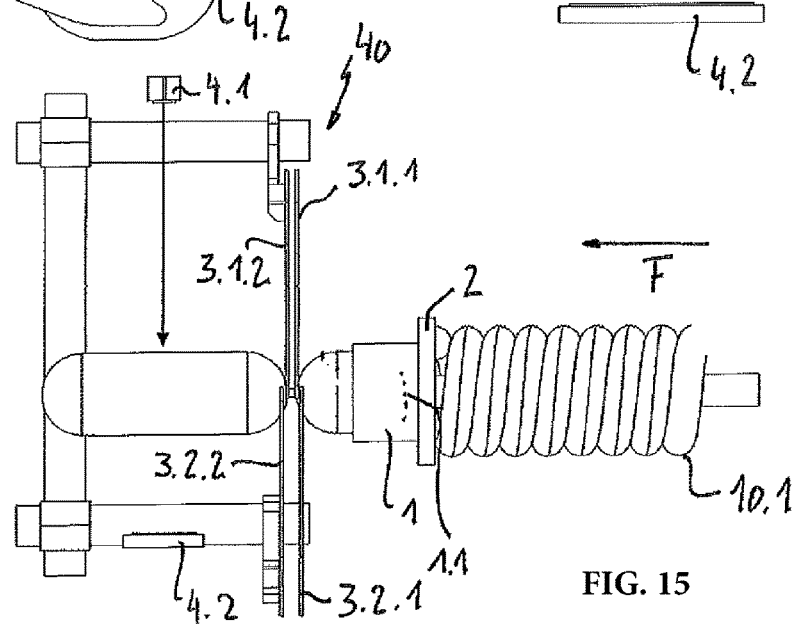
FIG. 15 shows the view as seen in the direction of arrow XVI according to FIG. 12.

A third arrangement of the measuring device 4 is illustrated in FIGS. 10 and 11. The transmitter 4.1 and the receiver 4.2 are arranged upstream of the casing brake 2 and thus establish the diameter of the gathered length of casing, said diameter being greater than the caliber K of the sausage 10 and being dependent on the diameter of the casing 10.1 and the thickness thereof. These known data can be used in the evaluating device 4.3 to calculate, in dependence on the desired length of the sausage 10, the diameter D of the latter and thus the caliber K thereof.

FIGS. 12 to 15 illustrate schematically the operation of determining the caliber K of the sausage 10 as a result of the light beams being emitted from the transmitter 4.1 and received by the receiver 4.2. When the clipper blades 3.1, 3.2 are moved from their fully open position $P_{open}$ into the fully closed position $P_{closed}$, and from the latter position back into the fully open position $P_{open}$, an operating cycle of the closing apparatus is performed. Within this operating cycle, it has to be ensured that there is no sausage meat exiting from the filling tube 1 if the opening 3.3 of the clipper blades 3.1, 3.2 is smaller than the caliber K of the sausage 10, because this can result in the casing 10.1 tearing. The period of time over which an operating cycle of the closing apparatus 40 is performed is constant because it is dependent only on the speed at which the clipper blades 3.1, 3.2 are driven. Since this period of time is constant, it is possible to calculate the point in time at which the opening 3.3 of the clipper blades 3.1, 3.2 reaches the size of the caliber K during the closing movement, and the latest point in time at which the filling operation then has to be stopped, and the point in time at which the opening 3.3 again reaches the size of the caliber K during the return movement of the clipper blades 3.1, 3.2, and the filling operation can be resumed without any risk of the casing 10.1 being damaged, because the string of sausages can pass through the opening 3.3. This therefore means that the filling operation can be begun again when the clipper blades 3.1, 3.2 have reached a position $P_{actual}$, which is reached at a point in time before the open position $P_{open}$. This position $P_{actual}$ is dependent on the caliber K established.

The above-described operation of establishing the caliber K takes place at the beginning of sausage production. The operating of filling the casing 10.1 is terminated when the clipper blades 3.1, 3.2 are moved out of their fully open position $P_{open}$ into their closed position $P_{closed}$, and begins again only when the fully open position $P_{open}$ has been reached again. This ensures that a sausage 10 of any caliber K reliably passes through the clipper blades 3.1, 3.2. Once the caliber K has been established, the operation of filling the casing 10.1 can be controlled correspondingly such that the filling operation, if appropriate, is terminated only when the clipper blades 3.1, 3.2 are moved from their fully open position $P_{open}$ into their fully closed position $P_{closed}$, and the filling operation begins again before the fully open position $P_{open}$ has been reached again.

It is also possible for the caliber K established to be indicated on an indicating device of the closure apparatus, so that said value can be entered into the filling apparatus by an operator. There is no need for said value to be fed directly to the control means of the filling device.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. An apparatus for closing pasty-substance-filled tubular casings to form products, comprising:
    a filling tube with an outlet opening, having a brake and having clipper blades, which can be moved toward one another in a direction transverse to a filling direction, and
    a measuring device, which establishes a caliber of the products in a contactless manner.

2. The apparatus as claimed in claim 1, wherein the measuring device comprises at least a transmitter, a detector and an evaluating device.

3. The apparatus as claimed in claim 1, wherein the measuring device is arranged downstream of the outlet opening and upstream of the brake, in relation to the filling direction.

4. The apparatus as claimed in claim 3, wherein, for the purpose of determining the caliber, the measuring device determines the diameter of the pasty-substance-filled tubular casing.

5. The apparatus as claimed in claim 1, wherein the measuring device is arranged downstream of the brake and upstream of the clipper blades, in relation to the filling direction.

6. The apparatus as claimed in claim 5, wherein the measuring device determines the caliber of the pasty-substance-filled casing.

7. The apparatus as claimed in claim 1 wherein the measuring device is arranged downstream of the clipper blades, in relation to the filling direction.

8. A method for operating the apparatus as claimed in claim 1, in which an operation of filling the casing with a pasty substance is interrupted when the clipper blades are moved out of a closed position $P_{closed}$, in which the clipper blades assume a minimum distance apart from one another and have displaced the pasty substance introduced into the casing, in the direction of an open position $P_{open}$, in which the clipper blades assume a maximum distance apart from one another, wherein the operation of filling the casing with the pasty substance is begun again when the clipper blades have reached a position $P_{actual}$, in which their distance apart from one another is at least equal to the caliber established by the measuring device, and the position $P_{actual}$ is reached at a point in time before the open position $P_{open}$.

9. The apparatus as claimed in claim 1, wherein the closing pasty-substance-filled tubular casings is closing sausage-meat-filled casings.

* * * * *